US005749596A

United States Patent [19]
Jensen et al.

[11] Patent Number: 5,749,596
[45] Date of Patent: May 12, 1998

[54] LATCHABLE STABILIZER BAR ACTUATOR

[75] Inventors: Eric Lee Jensen, Dayton; William Charles Kruckemeyer, Beavercreek; John David Fehring, Waynesville, all of Ohio

[73] Assignee: General Motors Corporation, Detroit, Mich.

[21] Appl. No.: 724,289

[22] Filed: Sep. 16, 1996

[51] Int. Cl.[6] ............................................ B60G 21/00
[52] U.S. Cl. ................... 280/689; 280/723; 267/64.12; 267/226; 188/300
[58] Field of Search .................. 280/689, 720, 280/723; 267/226, 64.12; 188/269, 300

[56] References Cited

U.S. PATENT DOCUMENTS

| | | | |
|---|---|---|---|
| 3,388,883 | 6/1968 | Axthammer et al. | 188/300 |
| 4,632,228 | 12/1986 | Oster et al. | 188/300 |
| 5,018,606 | 5/1991 | Carlson | 188/300 |
| 5,362,094 | 11/1994 | Jensen | 280/689 |
| 5,431,431 | 7/1995 | Fulks et al. | 280/721 |
| 5,505,480 | 4/1996 | Pascarella | 280/689 |
| 5,549,321 | 8/1996 | Novak et al. | 280/689 |

FOREIGN PATENT DOCUMENTS 2 006 131   5/1979   United Kingdom.

*Primary Examiner*—Kenneth R. Rice
*Attorney, Agent, or Firm*—Jeffrey A. Sedlar

[57] ABSTRACT

A roll control system with a latchable stabilizer bar actuator includes an anti-roll bar that is mounted to a vehicle's body and includes a pair of ends with one end rigidly connected to the vehicle's chassis and the second end connected to the vehicle's chassis through a hydraulic actuator. The hydraulic actuator includes a single cylindrical tube slidably carrying a piston. The piston separates the tube into first and second chambers. The piston carries a solenoid operated valve that effects latching and de-latching of the actuator for selectively effecting operation of the anti-roll bar.

5 Claims, 5 Drawing Sheets

LATCHABLE STABILIZER BAR ACTUATOR

TECHNICAL FIELD

The present invention relates to a latchable stabilizer bar actuator and more particularly, to a latchable stabilizer bar actuator for use in a vehicle's suspension system wherein the actuator is remotely latched and unlatched for use in selective roll control.

BACKGROUND OF THE INVENTION

U.S. Pat. No. 5,362,094 discloses a hydraulically controlled stabilizer bar system. That patent discloses a stabilizer bar system that includes a stabilizer bar connected to a support by a hydraulic actuator. A pump is used to force fluid through conduits connected to upper and lower chambers of the actuator. A check valve is provided between the pump and the actuator to restrict flow to one direction. A pressure control valve is provided between the check valve and the actuator and is controlled by an electronic controller to vary pressure in the actuator's chambers. The pressure control valve acts as a controllable fluid conduit which is adjusted to road conditions.

The prior art hydraulically controlled stabilizer bar system includes an ancillary hydraulic control system to operate the actuator. This relatively simple system is effective but requires double acting hydraulic cylinders, valves, manifold blocks, and conduit lines and therefore, is more difficult to package and can be costly to produce.

SUMMARY OF THE INVENTION

The present invention provides a roll control system with a stabilizer bar having a latchable actuator that applies new concepts to simplify controlled stabilizer bar systems. A roll control system according to the present invention includes an anti-roll bar that is mounted to the vehicle's body and includes a pair of ends with one end rigidly connected to the vehicle's chassis and the second end connected to the vehicle's chassis through a hydraulic actuator.

The hydraulic actuator includes a single cylindrical tube slidably carrying a piston. The piston separates the tube into first and second chambers wherein one of the chambers is further separated by a gas cup that sealingly divides out a charged gas chamber within the tube. The piston carries a solenoid operated valve that effects latching and de-latching of the actuator.

When the actuator is latched a rigid connection is provided between the second end of the anti-roll bar and the vehicle's chassis. When the actuator is latched and when one of the vehicle's wheels is deflected upwards and the other wheel is deflected downwards relative to the vehicle, such as during cornering of the vehicle which results in roll of the vehicle's body, the anti-roll bar is twisted and applies a force to the vehicle's chassis through the actuator that results in a preferential increase in the overall spring stiffness between the chassis and the vehicle body.

When the actuator's solenoid valve is open, the actuator is unlatched and the piston freely slides within the tube of the actuator. This means that when the anti-roll bar is twisted, its end connected to the actuator effects movement of the piston within the tube such that essentially no force is transmitted to the vehicle's chassis that would alter the normal spring rate of the vehicle's suspension system.

A control module is included such that if it determines that roll control is not required, the actuator's solenoid valve is positioned in an open position. During this mode of operation fluid can freely flow between the two chambers of the actuator allowing movement of the piston within the tube. When the control module detects that roll control is preferred, the solenoid is moved to a closed position wherein operation of the anti-roll bar takes effect.

By means of the present invention a self-contained actuator is provided for latching and de-latching an anti-roll bar. The actuator does not require an external hydraulic fluid source and therefore, no hydraulic connections are required which greatly increases the flexibility in packaging the actuator within a vehicle assembly. Additionally, by eliminating the ancillary power source the overall costs of the system remains relatively low.

DESCRIPTION OF THE PREFERRED EMBODIMENT

Figure 1:
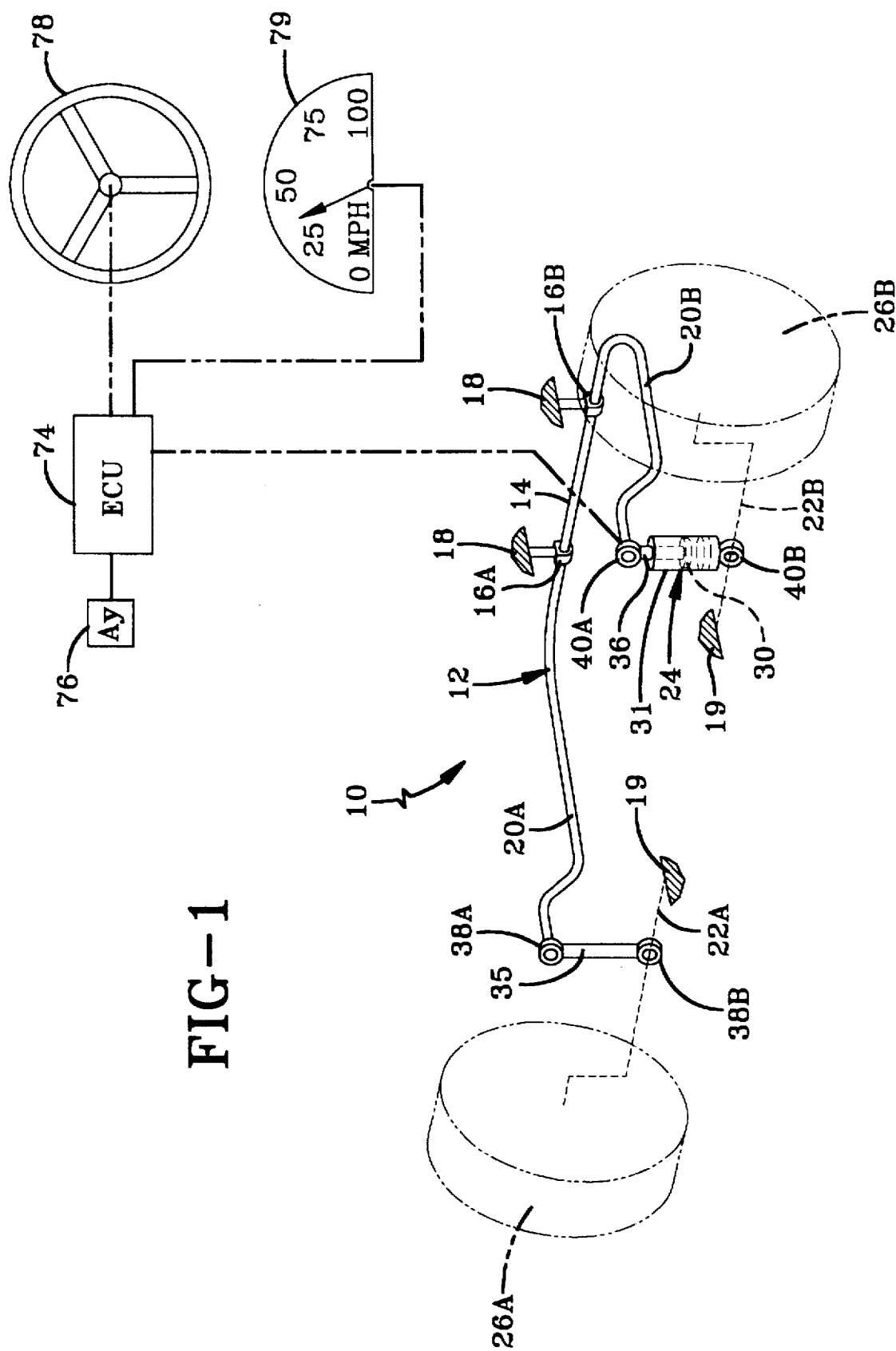
FIG. 1 is a schematic representation of a first embodiment of a stabilizer bar system according to the present invention.

Referring to the drawings, illustrated in FIG. 1 is a stabilizer bar system according to the present invention and indicated generally as 10. An anti-roll bar 12 includes a central cylindrical portion 14 transversely mounted with respect to the longitudinal axis of a vehicle. The central cylindrical portion 14 is rotatably mounted to a vehicle body 18 by means of brackets 16A and 16B. The anti-roll bar 12 also includes cranked ends 20A and 20B which extend from the cylindrical portion 14. Cranked end 20A is connected to the vehicle chassis 19 by means of connecting rod 35 which is attached at its upper end 38A to cranked end 20A and at its lower end 38B is attached to lower control arm 22A. The connecting rod 35 provides a rigid connection between the cranked end 20A and the chassis 19.

The cranked end 20B is connected to actuator rod 36 at end 40A. Rod 36 is fixed to piston 30 which is slidably carried in tube 31 of actuator 24. The end 40B of the actuator 24 is connected to chassis 19 through lower control arm 22B.

The vehicle's wheels 26A and 26B are carried by the vehicle chassis 19 which provides support for the vehicle body 18 through a plurality of suspension springs (not illustrated). The springs are provided with a relatively soft spring rate to result in optimum ride comfort for the passengers within the vehicle body 18. The anti-roll bar 12 operates in two modes. A first mode is provided wherein the suspension of the vehicle body 18 on the chassis 19 through the associated springs (not illustrated), provides a smooth and comfortable ride. A second mode is provided wherein the actuator 24 places the anti-roll bar 12 into operation wherein the effective spring stiffness between the chassis 19 and body 18 is increased significantly to change the manner in which the vehicle body 18 moves relative to the suspension.

The actuator 24 responds to electronic control unit 74. The ECU 74 includes an algorithm as conventionally known, to establish a current output that is provided to the actuator 24 based on predetermined inputs including lateral body acceleration, supplied by accelerometer 76, steering angle, supplied by steering angle sensor 78 and vehicle speed, supplied by speed sensor 79.

Figure 2:
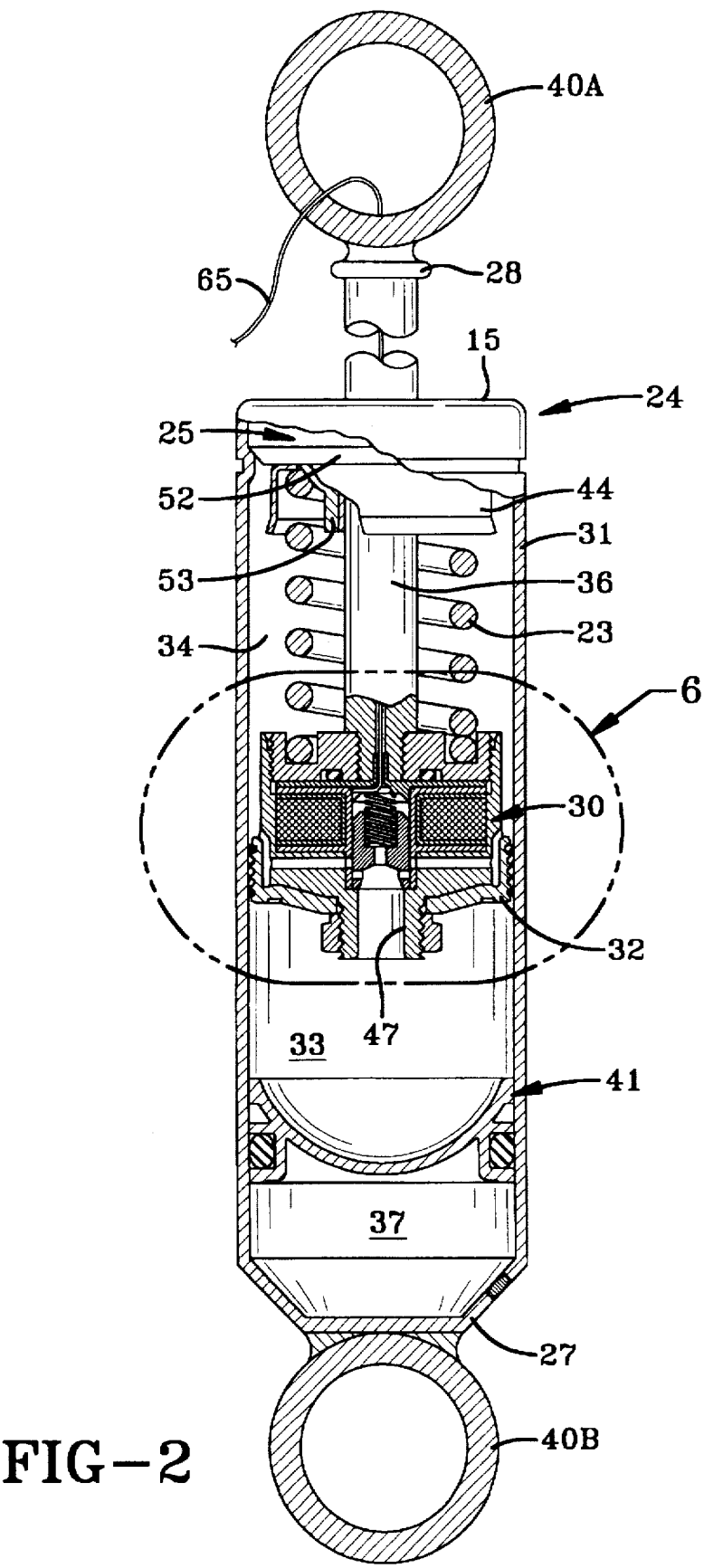
FIG. 2 is a fragmentary cross sectional illustration of the actuator of the stabilizer bar system defined by the embodiments of the present invention.
Figure 6:
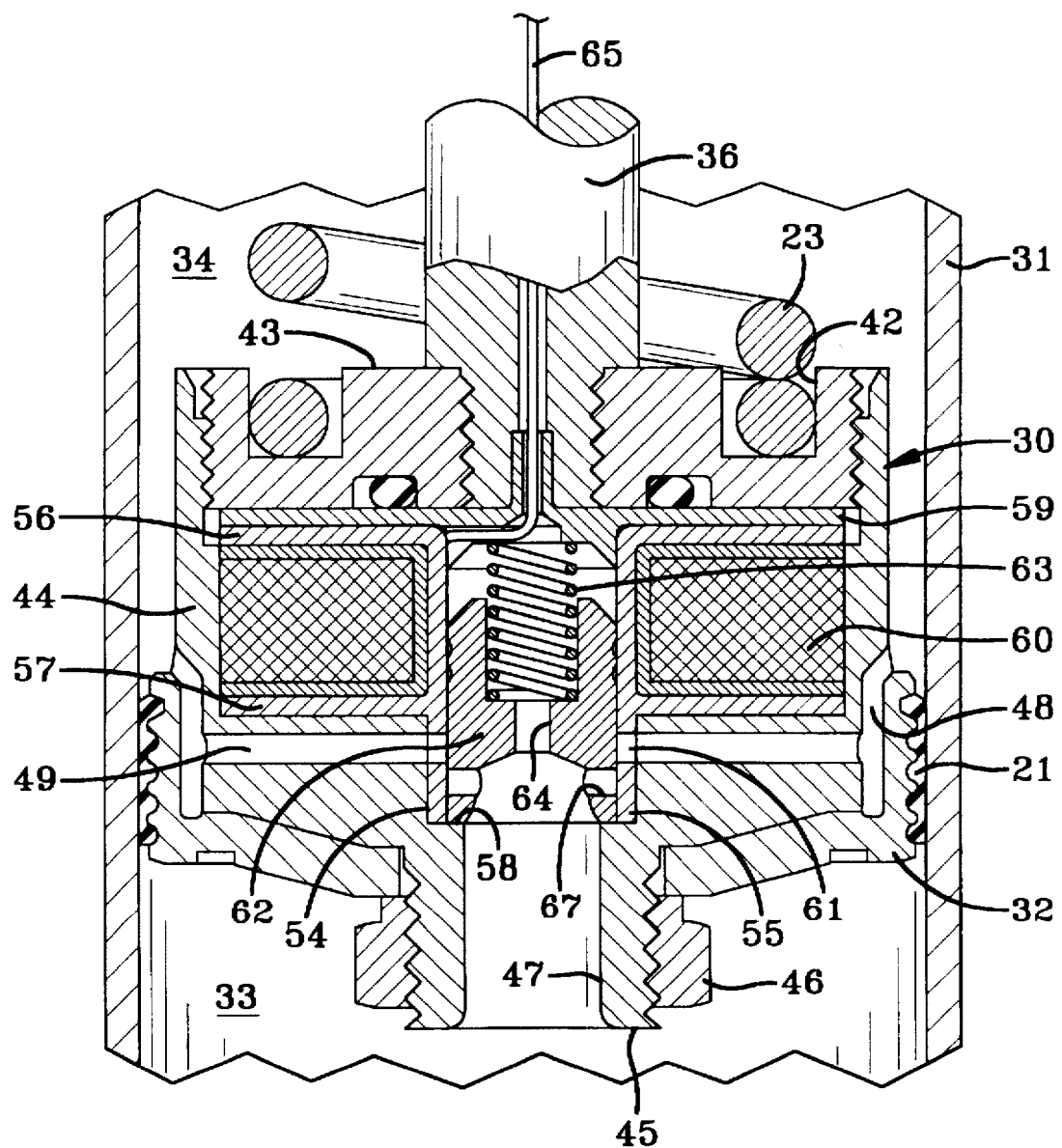
FIG. 6 is an enlarged view of the indicated area of FIG. 2.

Referring to FIGS. 2 and 6, the actuator 24 is illustrated in greater detail. Actuator 24 includes elongated cylindrical tube 31 which is closed at its lower end 27 and includes attachment fitting 40B. Piston assembly 30 is mounted for reciprocable movement within the tube 31. Piston assembly 30 includes a stamped steel piston body 32 which carries a band of low friction material 21 that sealingly and slidably engages the inner wall of tube 31. Piston assembly 30 hydraulically separates the tube 31 into two expansible and contractible working chambers designated as compression chamber 33 and extension chamber 34.

The upper end 15 of tube 31 is formed to securely carry a rod guide assembly 25. The piston rod 36 is securely connected to the piston assembly 30 and extends through extension chamber 34 exiting the tube 31 through the rod guide 25. The upper end 28 of rod 36 is securely connected to attachment fitting 40A.

The tube 31 carries a supply of oil which provides a medium for controlling movement of the piston assembly 30. When relative movement between the attachment fittings 40A and 40B occurs such that the piston assembly 30 slides within the tube 31 in a direction into the compression chamber 33, an increasing volumetric amount of the piston rod 36 enters the tube 31 through the rod guide assembly 25. Therefore, a means of accommodating for this increased volume of rod 36 within the actuator 24 must be provided. Accordingly, a compressible gas charge is carried within compensation chamber 37 which is separated from compression chamber 33 within the tube 31 by a reciprocating gas cup assembly 41.

As an increasing amount of the piston rod 36 enters the tube 31 during a compression stroke of the actuator 24, the gas within the compensation chamber 37 is compressed as the gas cup assembly 41 slides downward in response to displacement of the noncompressible hydraulic fluid carried within compression chamber 33 and extension chamber 34. A means of introducing a gas charge into the compensation chamber 37 is provided near the lower end 27 of actuator 24.

Since the pressurized gas charge exists within compensation chamber 37, the hydraulic fluid within compression chamber 33 and extension chamber 34 is under pressurization due to the gas charge. The fact that the rod 36 exits the actuator 24, means that unequal forces exists across the piston assembly 30. Therefore, a force exists which tends to push the piston assembly 30 upward driving the rod 36 out of the actuator 24 which is equal to the gas pressure times the area of the rod 36. Therefore, a spring 23 is positioned in the extension chamber 34 extending between the rod guide assembly 25 and the piston assembly 30.

The force applied to the piston assembly 30 by the spring 23 offsets the force applied to the piston assembly 30 by the gas charge in compensation chamber 37 so that when the actuator is at-rest the spring effects placement of the piston assembly 30 at mid-stroke between the ends 27 and 15 of the actuator 24. Placing the piston assembly 30 in the mid-stroke position when the actuator 24 is at-rest ensures that a distance of stroke of the piston assembly 30 within the tube 31 is provided in both directions during opposing role of the body 18 relative to the chassis 19. When the accumulator 24 is unlatched, it allows movement of the cranked end 20B to occur preventing operation of the anti-roll bar 12 which, when in operation, effects a change in spring rate of the suspension system between the vehicle body 18 and the chassis 19. The spring 23 extends from groove 42 of plate 43 on the piston assembly 30 to spring seat 44 which is attached to the rod guide assembly 25.

The rod guide assembly 25 includes a stamped metal rod guide body 52 which includes a lower annular leg forming a hub 53. Hub 53 surrounds piston rod 36 and includes a bearing surface between the rod guide 25 and the rod 36. The rod guide 25 also carries annular spring seat 44 which engages the spring 23. The upper end 15 of the tube 31 is formed over the rod guide 25 retaining it in position.

The piston assembly 30 includes a valve body 44 that is threaded onto the plate 43 and therethrough is retained rigidly on rod 36. The valve body 44 also includes an extension 45 onto which the piston body 32 is received. A nut 46 is threaded onto the extension 45 retaining the piston body 32 is position. A longitudinal bore 47 extends through the valve body 44 and opens to the compression chamber 33 through the extension 45. An annular cavity 48 is provided between the valve body 44 and the piston body 32 and a plurality of radial openings 49 intersect the longitudinal bore 47 and open to the annular cavity 48. The annular cavity 48 is continuously open to the extension chamber 34 between the valve body 44 and the tube 31.

An insert 54 simplifies assembly, is carried in the valve body 44, and includes a cylindrical element 55, and a pair of integral annular walls 56 and 57. The cylindrical wall 55 is positioned on annular seat 58 and an electromagnetic pole piece 59 is positioned between the annular wall 56 and the plate 43. A coil 60 comprised of a plurality of turns of wire wound on a bobbin is angular in shape and is carried between the annular walls 56 and 57.

The cylindrical element 55 includes a number of openings 61 which register with the radial openings 49 and the longitudinal bore 47 providing a communication path therebetween. A movable valve element 62 is biased toward annular seat 58 by a spring 63. Valve element 62 includes an opening 64 providing pressure balance across the valve element 62 and is movable from the position shown wherein the extension chamber 34 is closed off from the compression chamber 33 through the piston assembly 30 and a position wherein the extension chamber 34 is open to the compression chamber 33 through the piston assembly 30 through the cross bore 67.

An electrical lead 65 extends through the rod 36 and communicates with the coil 60 so that the coil is selectively energizable to cause the valve element 62 to move toward the pole piece 59 in response to an electromagnetic force. The primary air gap of the magnetic circuit is positioned within the insert 54 and between the pole piece 59 and the valve element 62.

When the valve is energized, registry is provided between the opening 61 and the longitudinal bore 47 through the cross bore 67 of valve element 62 providing relatively free fluid communication between the extension chamber 34 and the compression chamber 33. This permits sliding movement of the piston assembly 30 within the tube 31.

The valve is normally closed so that the actuator 24 is normally latched meaning that the anti-roll bar 12 is brought into operation. The ECU 74 processes signals from the lateral accelerometer 76, steering angle sensor 78 and speed sensor 79 to govern operation of the actuator 24 and to energize the valve when preferred. For example, when the actuator 24 is latched, sliding movement of the piston 30 within the tube 31 is effectively restricted by the hydraulic fluid contained in the extension chamber 34 and compression chamber 33. Thus, if the vehicle corners to the right and the body 18 moves to roll to the left in response, the rolling movement is checked by action of the anti-roll bar 12 which during a twisting motion applies force through the rod 25 and actuator 24 between the vehicle body 18 and the chassis 19 checking operation of the suspension spring and limiting roll of the vehicle.

When a roll limiting operation of the anti-roll bar 12 is not required, the actuator 24 is unlatched by energizing the coil 60 and moving the valve element so that fluid can freely flow between the extension chamber 34 and compression chamber 33 through the piston assembly 30. Therefore, when relative movement occurs between the wheels 26A, 26B and the vehicle body 18, the chassis 19 moves in response and is controlled by the suspension springs rather than by the anti-roll bar 12. The piston assembly 30 freely moves within the tube 31 so that the cranked end 20A and 20B do not act to transfer forces between the body 18 and suspension 19 in a manner that substantially affects the resulting ride qualities of the vehicle. As the cranked arms 20A and 20B move, the central cylindrical portion 14 is permitted to rotate within the brackets 16A and 16B.

Figure 3:
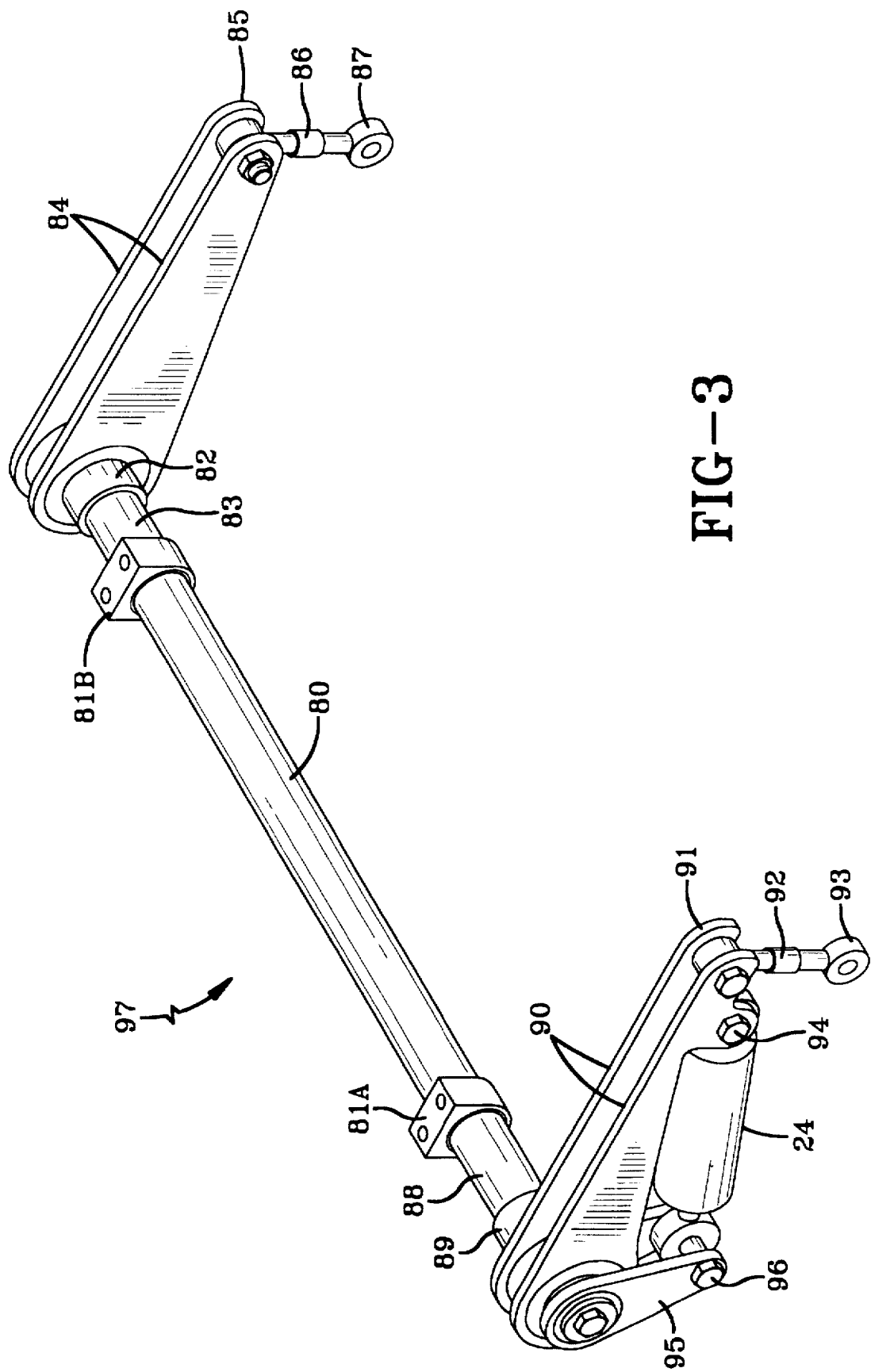
FIG. 3 is a perspective illustration of a second embodiment of the present invention.

Referring to FIG. 3, an additional embodiment of the present invention is illustrated. The anti-roll bar 80 is comprised of a cylindrical bar 80 which is carried on a vehicle body (not illustrated) by bushings 81A and 81B. The cylindrical bar 80 is mounted to rotate within the bushings 81A and 81B. A passive hub 82 connects end 83 of cylindrical bar 80 to a passive arm 84 comprised of two elongated plates. The passive hub 82 provides a rigid connection between the passive arm 84 and the end 83. The end 85 of passive arm 84 is pivotably connected to connecting rod 86 which includes an attachment fitting 87 for connection to the vehicle's chassis (not illustrated). The end 88 of cylindrical bar 80 carries an active hub 89 that rotatably connects active arm 90 to the cylindrical bar 80. The active arm 90 is comprised of a pair of elongated plates and includes an end 91 that is pivotably connected to connecting rod 92. Connecting rod 92 includes an attachment fitting 93 for connection to the vehicle's chassis (not illustrated). The active arm 90 also includes an attachment fitting 94.

Figure 4:
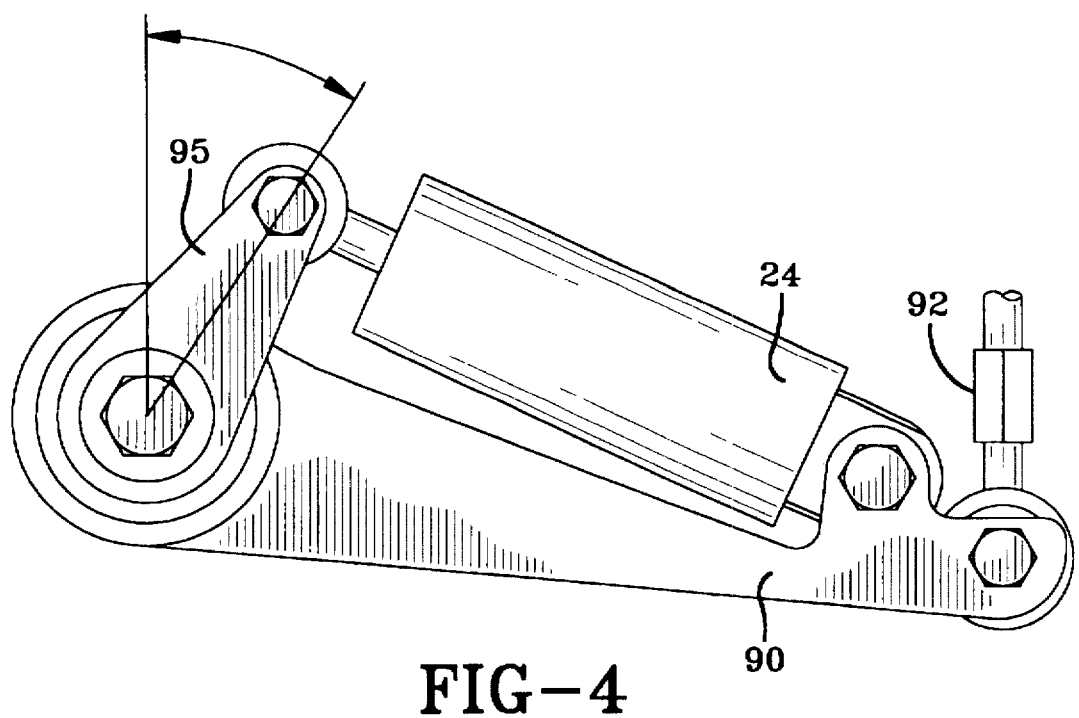
FIG. 4 is a detail illustration of the actuator area of the system illustrated in FIG. 3 shown in a first position.
Figure 5:
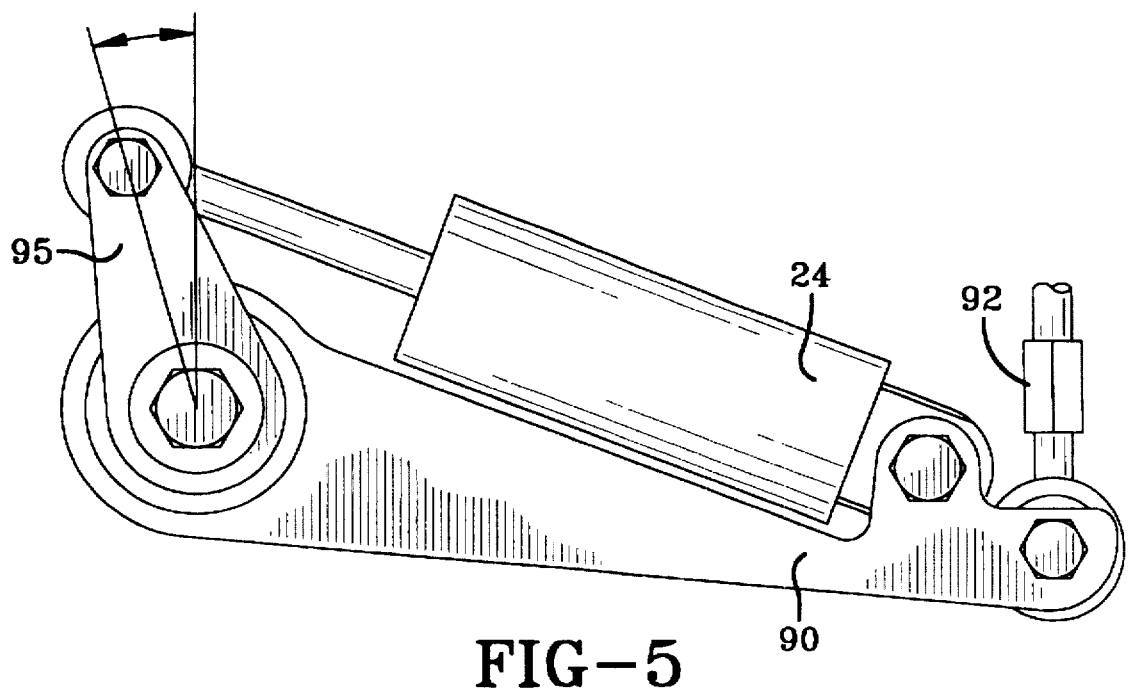
FIG. 5 is a detail illustration of the actuator area of the system illustrated in FIG. 3 shown in a second position.

A lever arm 95 is rigidly fixed to the end 88 of cylindrical bar 80 and includes an attachment fitting 96. The actuator 24 is connected between attachment fitting 96 of the lever arm 95 and the attachment fitting 94 of the active arm 90. When the actuator 24 is latched, relative rotation of the active bar 90 about the cylindrical bar 80 is prevented by the intervening actuator 24 and lever arm 95. When the actuator 24 is unlatched, the active bar 90 is permitted to rotate about the hub 88 relative to the cylindrical bar 80. During this operation the actuator 24 moves between a compressed state as illustrated in FIG. 4 and extended state as illustrated in FIG. 5. During this operation the lever arm 95 rotates with the cylindrical bar 80 relative to the active bar 90 so that relative movement between the associated vehicle's chassis is not substantially affected by the anti-roll bar 97.

In accordance with the present invention the ECU 74 responds to various inputs to latch and unlatch a stabilizer bar assembly such that when the actuator 24 is latched, relative twisting motion of the anti-roll bar 12 or 97 is substantially restricted. Therefore, the operation of the suspension spring is effectively checked. When the actuator 24 is unlatched, sliding movement of its piston assembly 30 within the tube 31 permits twisting of the anti-roll bar 12, 97 such that the relative movement between the vehicle's body 18 and chassis 19 is controlled by the suspension springs rather than anti-roll bar 12 or 97.

We claim:

1. A latchable stabilizer bar actuator comprising:

a tube having a first end that is closed and a second end closed by a rod guide defining a cavity that is permanently sealed;

a piston slidably carried in the tube and separating the cavity into a compression chamber and an extension chamber;

a rod connected to the piston, extending through the extension chamber and exiting the cavity through the rod guide;

a gas cup slidably carried in the tube and separating a gas charged compensation chamber off from the compression chamber within the tube wherein the gas charge applies a first force on the piston tending to drive the rod out of the cavity; and a spring extending between the rod guide and the piston wherein the spring applies a spring force to the piston that offsets the first force so that when the actuator is in an at-rest condition the combination of the first force and the spring force places the piston at a mid-stroke position within the tube.

2. A latchable stabilizer bar actuator comprising:

a tube having a first end that is closed and a second end closed by a rod guide defining a cavity that is permanently sealed;

a piston slidably carried in the tube and separating the cavity into a compression chamber and an extension chamber the piston including a valve body housing a coil and having an extension with a piston body fixed on the extension of the valve body and spanning across the cavity and engaging the tube, the coil being carried in an insert with an openable and closable valve element carried in the insert, the valve element being selectively positionable to open and close a flow path through the piston between the extension chamber and the compression chamber;

a rod connected to the plate of the piston and extending through the extension chamber and exiting the cavity through the rod guide;

a gas cup slidably carried in the tube and separating a gas charged compensation chamber off from the compression chamber within the tube wherein the gas charge applies a first force on the piston tending to drive the rod out of the cavity; and a spring extending between the rod guide and the piston wherein the spring applies a spring force to the piston that offsets the first force so that when the actuator is in an at-rest condition the combination of the first force and the spring force places the piston at a mid-stroke position within the tube.

3. A latchable stabilizer bar actuator according to claim 2 wherein the insert includes a cylindrical wall that carries the valve element and has a plurality of openings that that form part of the flow path through the piston and that are selectively opened and closed by the valve element and wherein the insert includes a pair of annular walls that carry the coil.

4. A latchable stabilizer bar actuator according to claim 3 further comprising a pole piece positioned between the plate and the insert and a spring positioned between the pole piece and the valve element wherein the pole piece extends into the insert and wherein a magnetic circuit is established by energization of the coil, the magnetic circuit including a primary air gap that is positioned within the insert and between the valve element and the pole piece.

5. A latchable stabilizer bar actuator comprising:

an elongated cylindrical tube having a wall closed at a first end by the wall and closed at a second end by a rod guide defining a permanently closed cavity;

a rod sealingly and slidably extending into the cavity through the rod guide;

a piston connected to the rod and separating the cavity into extension and compression chambers the piston including:

a mounting plate threaded onto the rod, the mounting plate having a groove, a valve body threaded onto the mounting plate, the valve body having an extension with a stepped longitudinal bore extending through the valve body including the extension with an annular groove formed in the valve body and a plurality of radially disposed openings extending between the longitudinal bore and the annular groove, a piston body spanning across the cavity and engaging the tube the piston body being fixed on the extension and including an annular wall being disposed around the annular groove of the valve body with an annular opening between the piston body and the valve body opening the annular groove to the extension chamber, an insert positioned in the longitudinal bore the insert having a cylindrical wall with a plurality of holes registering with the plurality of radially disposed openings and a pair of annular walls extending from the cylindrical wall, a coil carried in the insert around the cylindrical wall and between the annular walls, a flux plate positioned between the insert and the mounting plate and extending into the cylindrical wall of the insert, a valve element positioned within the cylindrical wall of the insert the valve element having across bore selectively registering with the plurality of holes of the insert, and a spring positioned between the flux plate and the valve element within the insert;

a gas cup positioned in the tube separating a compensation chamber off from the compression chamber, the compensation chamber carrying a gas charge that biases the piston toward the rod guide; and a spring extending between the rod guide and the groove of the mounting plate that balances the bias of the gas charge and normally positions the piston at a mid-stroke location within the tube.

* * * * *